United States Patent [19]
Allen

[11] Patent Number: 5,456,396
[45] Date of Patent: Oct. 10, 1995

[54] RACK LEVELER ADJUSTER

[75] Inventor: Scott R. Allen, Yuba City, Calif.

[73] Assignee: Mascotech Accessories, Inc., Sacramento, Calif.

[21] Appl. No.: 145,987

[22] Filed: Oct. 28, 1993

[51] Int. Cl.[6] .................................................. B60R 9/00
[52] U.S. Cl. ............................ 224/321; 224/309; 224/319
[58] Field of Search ........................... 224/321, 309, 224/324, 319, 42.03 B, 310, 311, 312, 313, 314, 315, 316, 317, 318, 320, 322, 323, 325, 326

[56] References Cited

U.S. PATENT DOCUMENTS

| | | | |
|---|---|---|---|
| Re. 27,170 | 6/1966 | Porter | 224/324 |
| 3,606,111 | 9/1971 | Gjesdahl | 224/321 |
| 3,792,805 | 2/1974 | Binding et al. | 224/321 |

*Primary Examiner*—Henry J. Recla
*Assistant Examiner*—David J. Walczak
*Attorney, Agent, or Firm*—Flehr, Hohbach, Test, Albritton & Herbert

[57] ABSTRACT

A carrier for a bicycle or the like for interaction with an automobile rooftop rack is described. The carrier includes level adjusters which interact with a cross bar to assure that the bicycle or other load being carried is supported vertically.

5 Claims, 2 Drawing Sheets

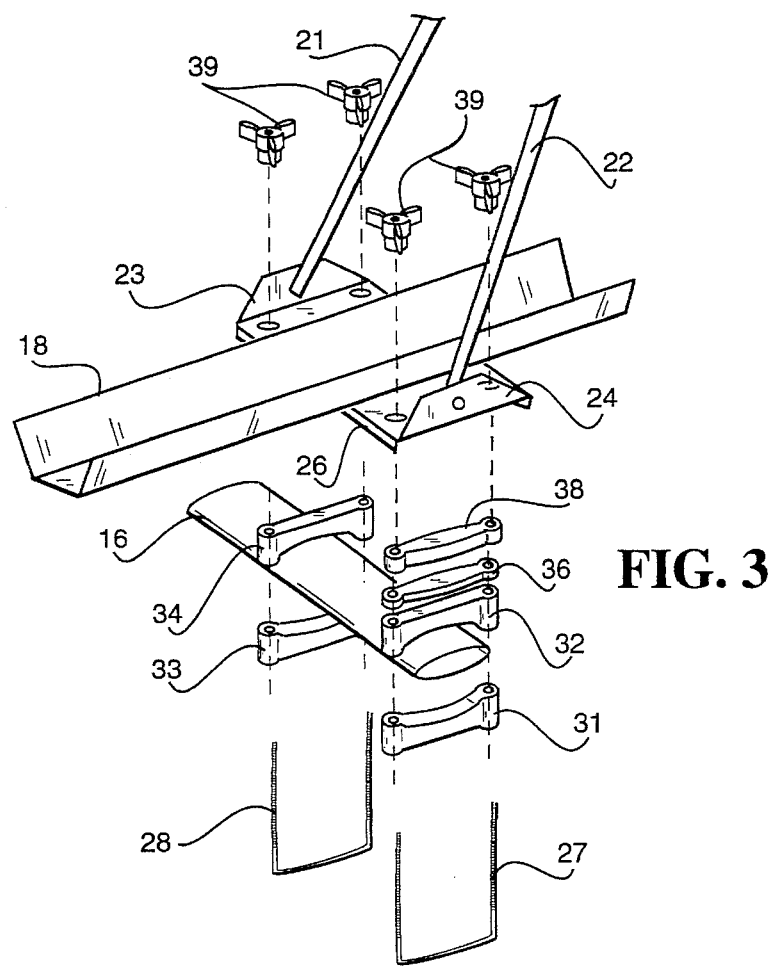
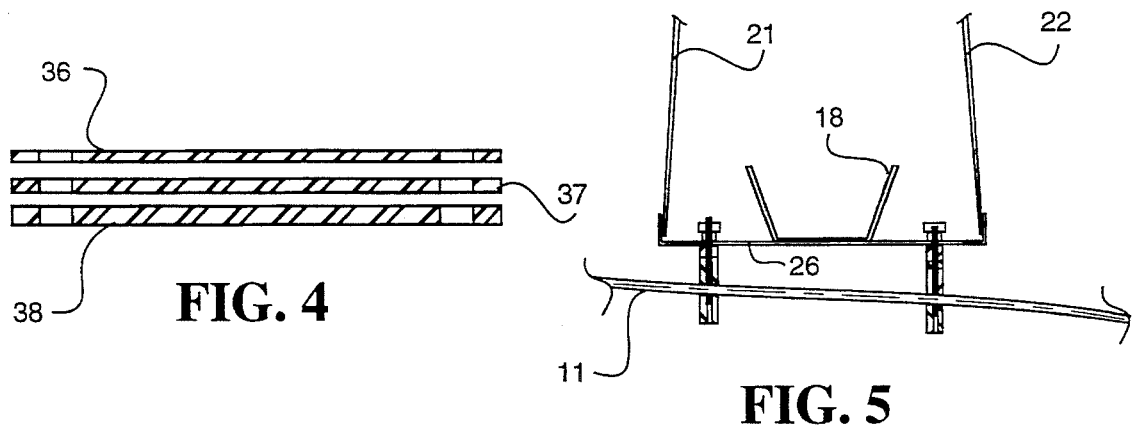

RACK LEVELER ADJUSTER

BACKGROUND OF THE INVENTION

The present invention relates to automotive vehicle racks and, more particularly, to a load carrier support of such a rack.

Roof racks which are provided as original equipment by an automotive vehicle manufacturer, typically are designed to be aesthetically pleasing. In this connection, the cross bars of such a rack are curved often from one side of the roof to the other to conform to the shape of the roof panel. While such a rack arrangement is aesthetically pleasing, the cross bars of the rack support articles they carry at an angle to the horizontal. This can be detrimental, particularly when the load is a recreational article such as a bicycle which projects upwardly a significant distance from the rack. It not only is unsightly to be carrying a bicycle or the like at an angle, doing so results in many detrimental stresses during transportation, both to the rack/carrier support and the load.

In order to avoid this problem, many of the "after market" roof racks that are available use a cross bar which is straight. While this avoids the problem, the rack is unsightly and does not at all conform to the vehicle design. It should be noted that even some after market racks use curved cross bars which are subject to the problems associated with such a curved bar.

SUMMARY OF THE INVENTION

The present invention relates to a carrier support for an automotive vehicle rack, which support is designed to provide a desired angular orientation to a rack cross bar. Thus, use of the same enables the user to adjust as necessary for the curve in a bar. In its basic aspects, the carrier support of the invention includes a pair of level adjusters which are positioned to be spaced apart along the bar, which adjusters define differing distances from a rack bar at their respective locations.

Most desirably, the adjusters are positioned between the remainder of the carrier support and interact with connecters securing the carrier support to the bar. Other features and advantages of the invention either will become apparent or will be described in connection with the following, more detailed description of a preferred embodiment of the invention.

BRIEF DESCRIPTION OF THE DRAWING

With reference to the accompanying drawing:

FIG. 3 is an exploded isometric view of such preferred embodiment;

FIG. 4 is a side sectional view of components of the preferred embodiment; and

FIG. 5 is a schematic and enlarged end view of the preferred embodiment.

DETAILED DESCRIPTION OF THE PREFERRED EMBODIMENT

The following relatively detailed description is provided to satisfy the patent statutes. It will be appreciated by those skilled in the art, though, that various changes and modifications can be made without departing from the invention.

Figure 1:
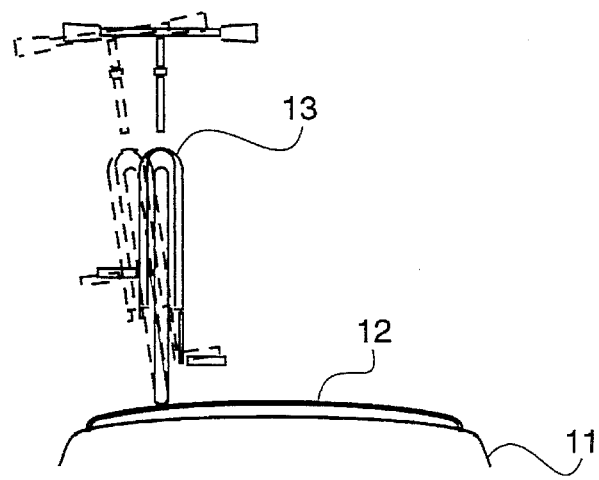
FIG. 1 is a schematic front elevation view illustrating use of a preferred embodiment of the carrier support of the invention with a bicycle.

A curved roof panel 11 of a vehicle is illustrated in FIG. 1, having a curved rack cross bar 12 of a rack. A bicycle 13 is illustrated generally vertical to the road surface (not shown) over which the vehicle travels. The bicycle is also shown though in phantom in the position at which it would be supported by prior art carrier supports secured to a curved rack bar.

Figure 2:
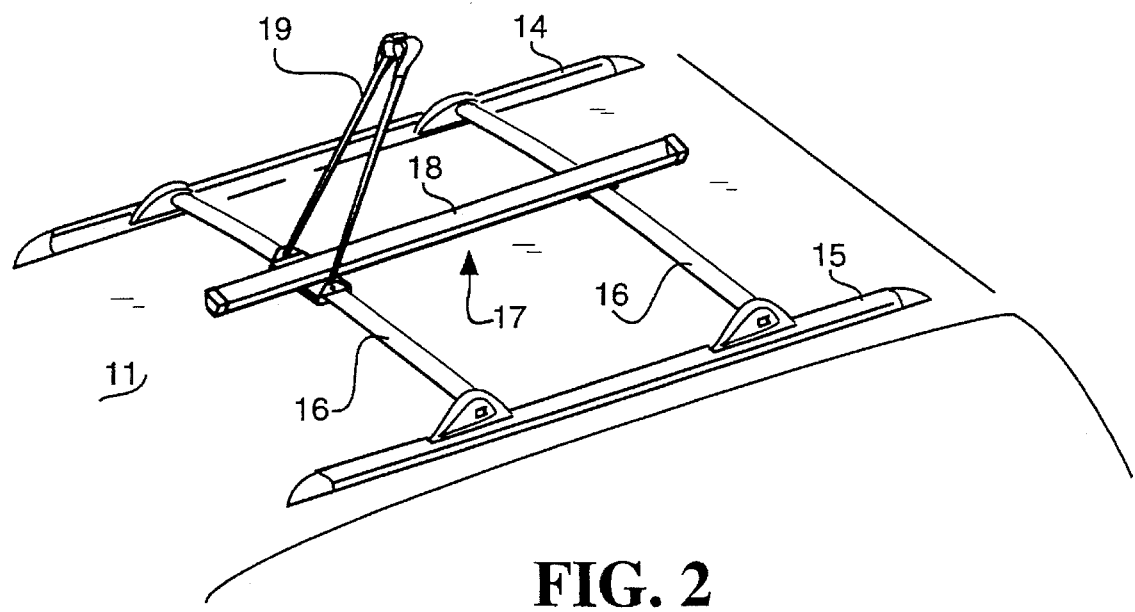
FIG. 2 is an isometric view of the preferred embodiment.

An automotive rack for a roof panel typically includes a pair of spaced-apart longitudinal side rails as shown at 14 and 15 in FIG. 2. Cross bars represented at 16 are included in such a rack for, among other things, securance of carrier support structure. As illustrated, cross bars 16 extend between the side rails laterally relative to the vehicle and roof panel 11. The embodiment of the invention being described is particularly adapted to be incorporated in a bicycle rack and, in this connection, a bicycle rack having the invention is generally referred to in FIG. 2 by the reference numeral 17. The rack includes a wheel tray 18 as is common, as well as a pivotable yoke 19 for securance to the front wheel of the bicycle. The rear wheel of a bicycle to be carried is secured to the rack by a flexible strap, not shown, as is typical.

The arms 21 and 22 of the yoke (see FIG. 3) project upwardly from end flanges 23 and 24 of a base plate 26. Such arms are pivotally secured to their respective flanges. In keeping with the invention, a pair of spaced-apart level adjusters are provided for the base plate. These level adjusters are incorporated into the connecters for connecting the carrier support to a cross bar. Each of such adjusters includes a U-bolt, U-bolts 27 and 28. Each of such U-bolts extends through a pair of connecter components 31, 32 and 33, 34. The surface of each of the connecter components which engages the bar 16 is shaped to generally conform to the bar surface as is illustrated. The level adjusters are positioned generally between the remainder of the carrier support and the bar 16.

At least one of the U-bolts 27 and 28 also passes through one or more distance adjustment shims 36, 37 and 38 (see FIG. 4). The purpose of the shims is to provide differing distances from the bar 16 at the location of the respective level adjusters. The assemblies of the U-bolts, the connecter components with the bar therebetween, the shims and the carrier plate 26 is completed by wing nuts 39. It will be recognized that tightening of such wing nuts will result in rigid securance of the carrier to the bar at the locations of the assemblies.

The presence or absence of the shims and the number and thickness provided by the shims when present, is selected by the user of the carrier when he/she installs the carrier. Thus, such user is able to "customize" the connection between the carrier support and the cross bar provided on his/her rack. Because the locations of the connections/level adjusters are spaced from one another axially along the bar (see FIG. 5), a desired degree of angular relationship can be obtained. In this connection, only the three shims of differing thickness are needed, intermediate thicknesses being able to be achieved by use of two of such shims.

It has been found that the securance of the carrier support to only one of the rack cross bars need include the level adjusters. This is as long as the securance to the other rack cross bar will enable the carrier support to achieve the angular orientation defined by the level adjusters. In the embodiment being described, the connection between the rear bar 16 and the carrier support is provided by a U-bolt of the type described above extending downward through the bottom of the tray 18 and through connector components of the type also described above on opposite sides of the cross bar. Wing nuts secure the U-bolt with the cross bar sandwiched between the connecter components. The angular orientation at the connection will vary with this construction to accommodate the angular orientation of the plate 26.

As mentioned at the beginning of the detailed description, Applicant is not limited to the specific embodiment described above. Various changes and modifications can be made. The claims, their equivalents and their equivalent language define the scope of protection.

What is claimed is:

1. In a carrier support for an automotive vehicle rack, the combination comprising:
  (a) a first level adjuster located to define a first distance between said support and a bar of an automotive vehicle rack at a first selected location;
  (b) a second level adjuster located to define a second distance between said support and said bar at a second location spaced axially along said bar from said first location, said second distance being different than said first distance;
  (c) a connector located at each of said level adjusters for connecting said support at such location to said bar; and
  (d) each of said level adjusters including one or more shims having selected thicknesses to help define said first and second differing distances, the thickness provided by said shims at each of said level adjuster locations being different from the thickness provided at the other of said level adjuster locations; and
  each of said level adjusters also including a U-bolt which sandwiches the rack bar at such location between a pair of component parts respectively having a surface engaging the rack bar, and holds said shims at such locations.

2. The carrier support of claim 1 wherein the surface of each of said component parts which engages said rack bar in said sandwich is shaped to generally conform to the expected surface thereat of a rack bar.

3. In a carrier support for an automotive vehicle rack, the combination comprising:
  (a) a first level adjuster located to define a first distance between said support and a bar of an automotive vehicle rack at a first selected location;
  (b) a second level adjuster located to define a second distance between said support and said bar at a second location spaced axially along said bar from said first location, said second distance being different than said first distance;
  (c) a connector located at each of said level adjusters for connecting said support at its location to said bar; and
  (d) each of said level adjusters also including a U-bolt which sandwiches the rack bar respectively at each of said first and second locations between a pair of component parts and holds said shims at such locations.

4. In a carrier support for an automotive vehicle rack, the combination comprising:
  (a) a first level adjuster located to be positioned generally between said remainder and a bar of an automotive vehicle rack and to define a first distance between said support and said bar at a first selected location;
  (b) a second level adjuster located to be positioned generally between said remainder and a bar of an automotive vehicle rack and to define a second distance between said support and said bar at a second location spaced axially along said bar from said first location, said second distance being different than said first distance;
  (c) a connecter located at each of said level adjusters for connecting said support at such location to said bar;
  (d) each of said level adjusters also including a U-bolt which sandwiches the rack bar at its location between a pair of component parts respectively having a surface engaging the rack bar and one or more shims to help define said first and second differing distances, said shims being held at their respective locations by the U-bolt at each of such locations.

5. The carrier support of claim 4 wherein said surface of each of said component parts which engages said rack bar in said sandwich is shaped to generally conform to the expected surface thereat of a rack bar.

* * * * *